United States Patent [19] [11] 3,979,559
Roedel et al. [45] Sept. 7, 1976

[54] DATA MODEM HAVING LINE
VERIFICATION AND AUTOMATIC
DISCONNECT FEATURES

[75] Inventors: Charles William Roedel, Miami
Shores, Fla.; Richard Borysiewicz,
Smithtown, N.Y.; Richard Tan So;
Larry Wayne Swan, both of Miami,
Fla.

[73] Assignee: Milgo Electronics Corporation,
Miami, Fla.

[22] Filed: Sept. 2, 1975

[21] Appl. No.: 609,596

Related U.S. Application Data

[63] Continuation-in-part of Ser. No. 438,386, Jan. 31,
1974, Pat. No. 3,927,265.

[52] U.S. Cl. .............................................. 179/2 DP
[51] Int. Cl.² ......................................... H04M 11/06
[58] Field of Search ........... 179/2 DP, 170.2, 170.4,
179/170.6; 178/66 R

[56] References Cited
UNITED STATES PATENTS 3,908,086  9/1975  Marino et al. ..................... 179/2 DP
3,935,403  1/1976  Penicaud et al. ................. 179/170.2

Primary Examiner—Kathleen H. Claffy
Assistant Examiner—C. T. Bartz
Attorney, Agent, or Firm—Jackson & Jones

[57] ABSTRACT

Modems having line verification circuitry for automatically advising that a direct distance dialed network has been connected between the communicating modems with the echo suppressors in the network disabled, is disclosed. The line verification circuitry is either identical for all modems or may be master/slave equipment. The line verification circuitry includes a first tone generator for emitting a unique tone for disablingthe echo suppressors in the telephone line. A communicating modem, upon receiving this unique tone activates a second tone generator that emits a different second tone which is not capable of disabling the echo suppressors but is capable of transmission through the telephone line when the echo suppressors are disabled. (63)disabling the at both modems respond to the first and second tones for automatically verifying the existence of the desired communication link.

The modem provides a data set ready signal to the data terminal equipment upon a telephone line being established between the communicating modems until completion of data transmission, in spite of gaps between data messages.

14 Claims, 5 Drawing Figures

DATA MODEM HAVING LINE VERIFICATION AND AUTOMATIC DISCONNECT FEATURES

CROSS-REFERENCE TO RELATED APPLICATION

This application is a continuation-in-part of application Ser. No. 438,386 now U.S. Pat. No. 3,927,265 filed Jan. 31, 1974 for Data Modem Having Line Verification and Automatic Disconnect Features.

BACKGROUND OF THE INVENTION

The invention generally relates to data communication systems and more specifically relates to data modems adapted for two-wire/half-duplex operation through direct distance dialed (DDD) networks.

The use of data modems to transmit data over ordinary telephone lines through direct distance dialed (DDD) networks is commonplace today. Presently, independent manufacturers of data modems supply a large portion of such modem equipment as compared to the past wherein telephone companies supplied virtually all the modem equipment. In today's marketplace, however, the independent modem manufacturers are still faced with the problem of establishing data connections through direct distance dialed telephone lines and the associated equipment provided by telephone companies. Accordingly, much ingenuity is exercised by the independent manufacturers of modems in adapting their products to provide maximum efficiency while operating the telephone equipment over which they have no control.

As an example, the independent manufacturers of modems must adapt their products to operate over long distance voice communication telephone networks. In such telephone networks, the telephone company introduces large amounts of amplification in a pair of separate two-wire/one-way paths located in the DDD networks. Conventional two-to-four wire hybrid circuits convert between a two-wire/two-way circuit found at a location including a subscriber's telephone, or modem, and the pair of two-wire/one-way circuits normally found in the DDD networks between central offices. If these hybrid circuits were perfectly balanced, no signal intended to be transmitted from a sending to a receiving line would reflect back into the input of the sending line. In actual practice, however, the numerous switching connections and variety of trunks and subscriber lines make it impossible to have anywhere near perfect balance in the hybrid circuits. As a result, a portion of the signal always loops around the pair of two-wire/one-way paths and is reflected back to the two-wire/two-way circuits at the subscriber locations. These reflected signals are termed "echo signals".

In order to avoid these undesirable echoes, DDD networks include echo suppressors. In normal operation, an echo suppressor provides a low impedance to a voice signal traveling in direction on one two-wire/one-path while simultaneously providing a high impedance in the other two-wire/one-way path of the network so that echoes of the voice signals are blocked.

When bi-directional data transmission is desired, these echo suppressors must be inactivated. This is accomplished by transmitting a tone of a particular frequency over the established direct distance dialed telephone line which is connected between two subscriber locations. The echo suppressors respond to this unique tone by assuming a low impedance in both directions, wherein the echo suppressors are effectively removed from the direct distance dialed network.

The assignee of this invention has provided a dramatic increase in the data throughput of data through a direct distance dialed network when modems are operating in a two-wire/half-duplex mode. The invention assigned to the same assignee as the present invention has been termed FASTAR which is a trademark of the assignee of this invention. The FASTAR invention is fully described and claimed in U.S. Pat. No. 3,783,194 issued Jan. 1, 1974.

Briefly, the FASTAR invention generates a unique tone to initially disable the echo suppressors. Thereafter, whenever the network is free of data transmission in either direction, and the line must remain in a data transmission mode, a tone generator in a modem is enabled. The tone generator supplies a signal at a frequency which is outside the frequency range of data transmission, and it assures that energy is not absent from the network for a predetermined time which would cause the echo suppressors to again be enabled. This additional signal thus maintains the echo suppressors in a disabled condition during absence of data transfer in either direction. As a result of the FASTAR invention, data transmission is accomplished with reduced turn-around time, i.e. one modem can send data almost immediately after the other modem finished sending a block of data.

Although dramatically improving data throughput, the FASTAR invention does require an operator to monitor the status of the modem and make a presumption that the echo suppressors have been disabled. Our invention not only obviates the requirement for an operator's attention to the modem, but in addition verifies that a line is established between communicating modems. Furthermore, our invention automatically verifies that the echo suppressors are disabled and an acceptable line for data communication exists between the modems.

SUMMARY OF THE INVENTION

The modems of our invention employ line verification circuits having an internal timing sequence to control sending and receiving of two unique tones. In freely interchangeable modems, the sending and receiving is mutually exclusive at each modem so that a modem isolates its own signals from being interpreted as though they have been received from the other modem. Both modems operate on a race principle wherein the first modem which receives the first unique tone inhibits further sending of its first tone, and instead "listens" for a predetermined time duration for that first tone. The listening period is of sufficient duration to guarantee that the echo suppressors are disabled. The listening modem then "answers" with a second unique tone, which is at a frequency selected to be at the edge of the transmission bandwidth of the network. This second tone, when received at the other modem, verifies that an acceptable two-way communication path exists between the two modems. Its presence keeps energy on the line to assure that the disabled echo suppressors remain disabled. After both modems have automatically verified the establishment of an acceptable two-way communication path, data set ready signals are delivered by the modems to their associated data terminal equipment. From that point on, the data terminal equipment and the data modems operate in well known normal routines.

In certain instances involving a severally attenuated telephone line, the transmitted second tone may not be received. The sending modem is thus ready to send data while the receiving modem is not ready to receive data. In a preferred embodiment of this invention, one delay circuit each is provided for each line verification circuit. The delay circuits respond to transmission of the second tone by allowing sufficient guard time for the line verification circuit that expects, but does not receive, the second tone to re-initiate a line verification sequence before the sending modem is switched into a send data state. Such reinitiation will continue until an acceptable line has been verified as being established between both modems.

This invention provides modems that may be made identical or establish a master/slave relationship. Having all modems identical is very important in replacement situations because it obviates concern about whether or not the replacement modem has exactly the same configuration as to operation, strap options, and the like. Master/slave configurations, on the other hand, are simpler in operation and involve less circuitry.

DESCRIPTION OF THE PREFERRED EMBODIMENT

Figure 1:
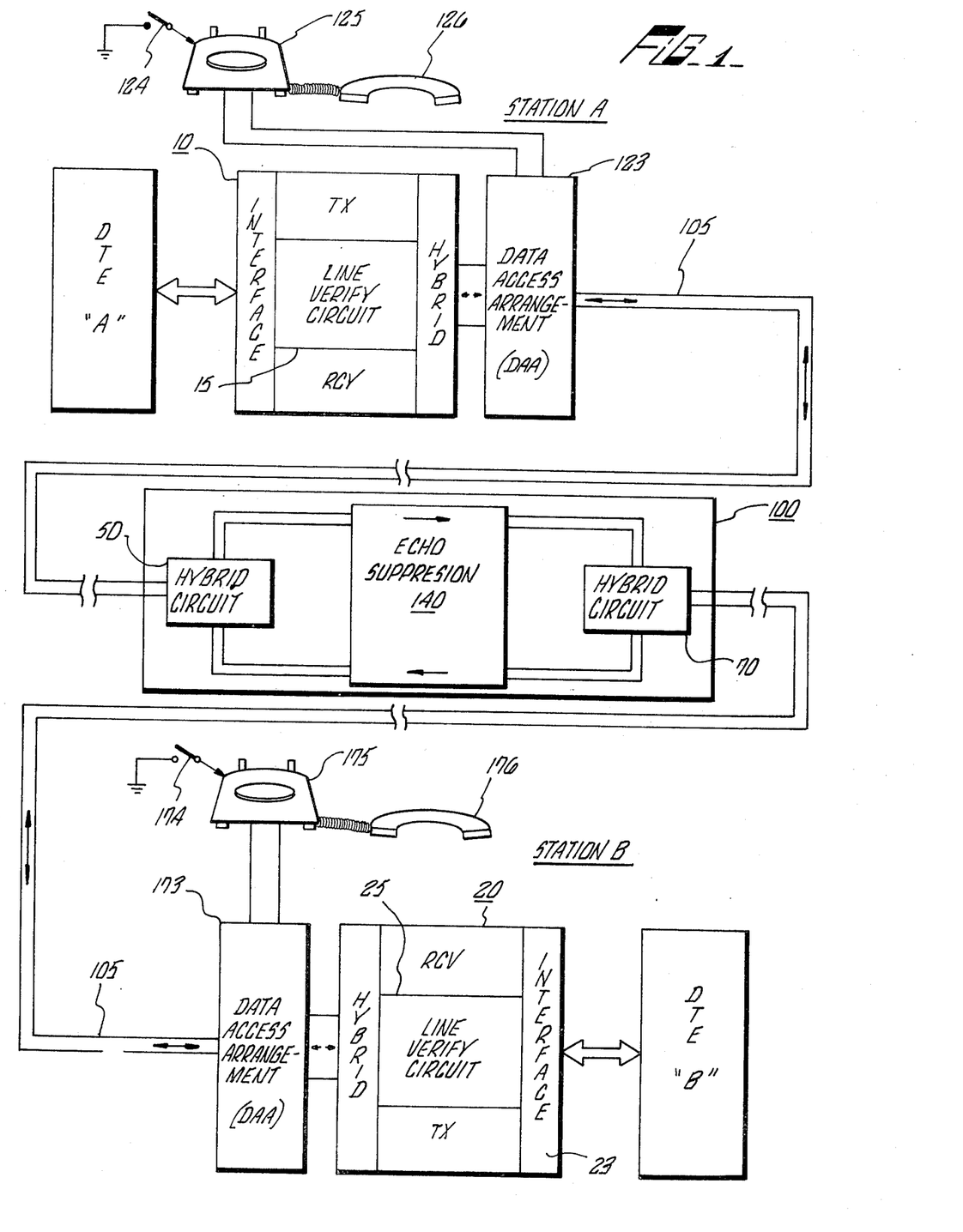
FIG. 1 discloses a two-wire/half-duplex operational mode for two modems connected together over a direct distance dialed network. Each modem is interchangeable and incorporates line verify circuits of this invention. The modems of this invention provide a data set ready signal to data terminal equipment upon a telephone line being established between the communicating modems until completion of data transmission, in spite of gaps between data messages.

Turning now to FIG. 1, a block diagram of two subscriber locations, station A and station B is depicted. At both stations, data terminal equipment (DTE), a modem, and a telephone set with its associated data access arrangement (DAA) are depicted. The telephone set, 125 at station A, may be any standard telephone set equipped with an exclusion key 124. An exclusion key is a manually operable switch at an appropriate time is actuated by an operator to adapt the telephone set from a voice condition to a data condition. Connected to the telephone 124 is a manual DAA or an automatic DAA of a well known type as described, for example in Bell System Technical References entitled "Data Couplers CBS and CBT for Automatic Terminals." August 1970 and "Data Access Arrangement CDT for Manual Orginating and Answering Terminals", May 1971.

Operational details for the exclusion key, the telephone set and the DAA's are fully described in the aforementioned publication and the details need not be described here. Such equipment provides functions and signals which are incidental to an explanation of this invention; and briefly stated, an operator employs the telephone set with its DAA to establish a telephone line connection first voice and then for data transmission between stations A and B. In order for the operator to establish a path through DDD network 100, he dials the called station, such as station B. Once voice communication between the operators at stations A and B has been established, the operators agree to transfer the telephone line from voice to data handling status by respectively activating the exclusion keys 124 and 174.

In the event that DAA 123 and DAA 173 are of the manual type, they respond to an exclusion key actuation by simply transferring the telephone lines 105 to the data modems. If DAA 123 and DAA 173 are of the automatic type, they emit a signal indicative of that transfer. Such a signal is known in the industry as CCT (coupler cut through).

The telephone and DAA equipment additionally provide a loop holding path for accounting and supervision by the telephone company. In that regard, once data transmission is finished by both modems, the data terminal equipment (DTE) of a particular type may apply a disconnect signal through its modem to the respective DAA so that the telephone line is released. If the DTE is of a type which does not provide such a signal, the line verify circuit of this invention includes an automatic disconnect feature. The automatic disconnect commands the DAA to release the telephone line when data transmission is completed as determined by certain monitored parameters.

At this point, the operators at both stations A and B have initiated the call and have cut the telephone line through to modems 10 and 20. At this point in prior art systems, the operators do not know whether the echo suppressors have been removed from the telephone line, nor do they know for a fact whether or not a two-way data path through the DDD network 100 actually exists. Furthermore, the operators have no assurance that the echo suppressors are disabled for proper data transmission. In this latter regard, it must be kept in mind that voice communication will not establish that the echo suppressors have been disabled, since they are designed to function in a voice communication environment. It is thus a feature of this invention that modems 10 and 20 employ automatic verification circuits 15 and 25 to determine that a proper two-way communication path is available for data transmission through DDD network 100.

The line establishment verification circuit of this invention alternately sends out and listens for a unique tone that is selected to have a frequency capable of disabling all echo suppressors, such as 140, in the DDD network 100. The modem line verification circuits 15 and 25 are purposely designed as asynchronous in order to avoid the possibility that the modems lock up. By lock up, it is meant that both modems are each simultaneously sending and simultaneously listening for the other. To avoid that possibility, the first line verification circuit that receives a unique first tone, quits transmitting its own first tone and assumes a listening mode of operation.

After a predetermined time burst of the first tone has been received by the first modem from the other modem's line verification circuit, the first modem then answers with a second unique tone. The second unique tone is transmitted over the telephone line for a predetermined period. The second tone is selected near the edge of the telephone lines' bandwidth. Accordingly, when it is received it is a good indication that not only are the echo suppressors disabled but the transmission line is of sufficient quality for data transmission. A bad or marginal line would so severely attenuate the second tone that it might not be properly received.

In instances involving a severely attenuated telephone line, the transmitted second tone may not be received. The modem sending the second tone is thus read to immediately send data while the other modem is not ready to receive the data since it did not receive the second tone. In a preferred embodiment of this invention, one delay circuit each is provided for each line verification circuit. The delay circuits respond to both transmission and reception of the second tone to prevent either modem from being switched into a data ready state before the other modem. This delay provides sufficient guard time for the line verification circuit that expects, but does not receive, the second tone to re-initiate a line verification sequence prior to the sending modem being switched into a data ready state. Such re-initiation will continue until an acceptable line has been verified as being established between both modems.

Figure 2:
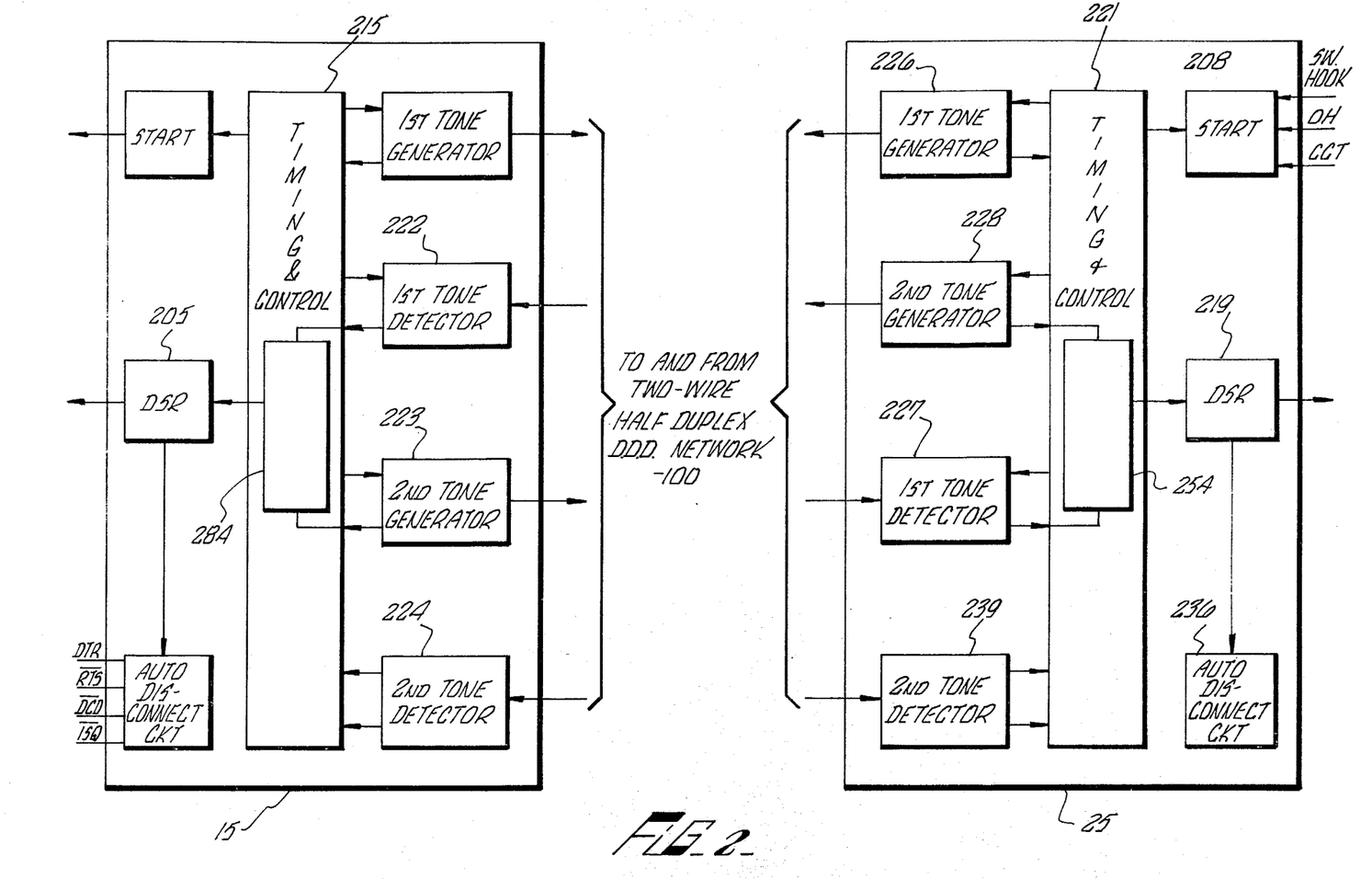
FIG. 2 is a block diagram of the line verify circuits of FIG. 1.

FIG. 2 discloses a detailed block diagram of line verification circuits 15 and 25 of FIG. 1. Since both circuits 15 and 25 are identical, only the operation of circuit 25 will be described in detail. Line verification circuit 25 includes a timing and control logic circuit 221. Control circuit 221 is asynchronous with respect to timing and control circuit 215 at line verification circuit 15. Control circuit 221 includes an on/off timing cycle which alternately energizes and inhibits a first tone generator 226. The tone generator 226 responds to timing and control circuit 221 by emitting a first tone having a unique frequency for a predetermined time duration. The time duration has been selected to be approximately 800 ms. on and 800 ms. off. The frequency of the first tone has been selected at 2025 Hz. These parameters are both selected to guarantee that all echo suppressors in the DDD network 100 are disabled in the manner fully described in the aforementioned FASTAR patent.

Similarly, a corresponding first tone is also sent from the line verify circuit 15 of A. This tone may be received by line verify circuit 25 of modem 20 at station B provided that modem 20 is in its listening interval. Control circuit 221 is in its listening interval during the time that its first tone generator 226 is disabled, and its first tone detector 227 is enabled.

If a first tone is not detected by the enabled detector 227, timing control 221 re-enables the first tone generator 226 to again transmit its first tone. At both ends of the telephone network, line verification circuits 15 and 25 are involved in this alternate send and receive operation. Obviously, the timing sequence controls 221 and 215 must be asynchronous. Both modems cannot get locked together in a mode wherein both are simultaneously sending and receiving. Because of the asynchronous timing, the controls 221 and 215 drift apart in a matter of a few hundred milliseconds.

Assume that drift causes line verification circuit 15 to be sending out its first tone when line verification circuit 25 at station B is in its listening mode. That first tone from line verification circuit 15 is assumed to start some 20 to 50 ms. ahead of the time that line verification circuit 25 at station B is scheduled to start sending its first tone. Consequently, the first tone is detected by the tone detector 227 at line verification circuit 25. Accordingly, line verification circuit 25 prevents transmission of its first tone and remains in a listening mode.

Approximately 400 ms. of the first tone must be received by circuit 25 in order for all echo suppressors to be disabled. After that 400 ms. interval has elapsed, then line verification circuit 25 sends out a predetermined time burst of a second tone from the generator 228. That burst is received by circuit 15 of modem 10 and is responded to be a second tone detector 224. Connected to the tone generator 228 is a time delay circuit 254. The delay circuit 254 provides a delay of about 1.5 seconds to a command signal emitted by tone generator 228. After the 1.5 second delay, control circuit 221 enables the data set read (DSR) circuitry 219 causing it to emit a DSR signal to DTE B.

If the 2900 Hz second tone was received by the line verification circuit 15 at modem 10 for at least 120 ms. of a command signal is sent to delay circuit 284 in control 215. The delay circuit 284 provides a 1.5 second delay, after which the control circuit 215 enables its data set ready (DSR) circuitry 205. The converse situation exists if the line verify circuit 15 of modem 10 happens to receive the first tone first. In other words, it will send out a seond tone by way of the generator 223 and enable its DSR 205, 1.5 seconds thereafter by way of delay 284. Line verify circuit 250 of modem 20 will enable its DSR 219 1.5 seconds after reception of this second tone.

The reason for the 1.5 second delays as provided by delay circuits 254 and 284 is to avoid a situation where one modem has DSR true and the other modem has DSR false even though both line verification circuits for the modems have completed their line verification sequences. Take the above example where modem 20 was the first to receive the first on 2025 Hz tone and answers by transmitting the second frequency tone. Assume that the telephone line used is so severely attenuated at the high frequency end that the second tone transmitted by modem 20 does not reach modem 10 with sufficient strength to be detected by the second tone detector 224 of modem 10. If delay circuit 254 were not present, modem 20 would raise its DSR to true immediately upon transmission of the second tone. Modem 10, on the other hand, because of the telephone line, is unable to detect the second tone, so it maintains its DSR false. This creates the intolerable situation wherein modem 20 sends data to modem 10 while modem 10 has its DSR false and thus cannot accept data.

In order to avoid the above-noted situation, a 1.5 second delay circuit is provided at both line verification circuits. The delay circuits prevent one modem from sending data to a modem that cannot accept such data. For example, if the second tone transmitted by modem 20 is so severely attenuated that modem 10 does not receive that tone, then modem 10 keeps its DSR at a false level. As described earlier, when the DSR for modem 10 is false, the line verification circuit 15 automatically re-transmits the first, or 2025 Hz tone as another line verification sequence. This occurs within the 1.5 second delay introduced by delay 254 at modem 20. Accordingly, a telephone line that severly attenuates the second high frequency tone will result in the situation wherein the DSR signals from both modems stay false due to the presence of the delay circuits. With the DSR signals false, no data transmission can occur until an acceptable telephone line is established and verified between the two modems. With a good line, on the other hand, the DSR signals of both modems 10 and 20 are raising approximately 1.5 seconds after the second unique tone has been transmitted.

Various equalization and data message swapping operations take place between modems 10 and 20 during the normal modem operation that follows thereafter. Such operations are fully described in another patent application concurrently filed herewith and assigned to the same assignee as the present invention listing Richard Borysiewicz and Charles W. Roedel as inventors, and entitled "Data Modems with Automatic Equalization, Drop-Out Detection and Data Echo Protection", assigned Ser. No. 438,387 now U.S. Pat. No. 3,927,265 filed Jan. 31, 1974.

Figure 3A:
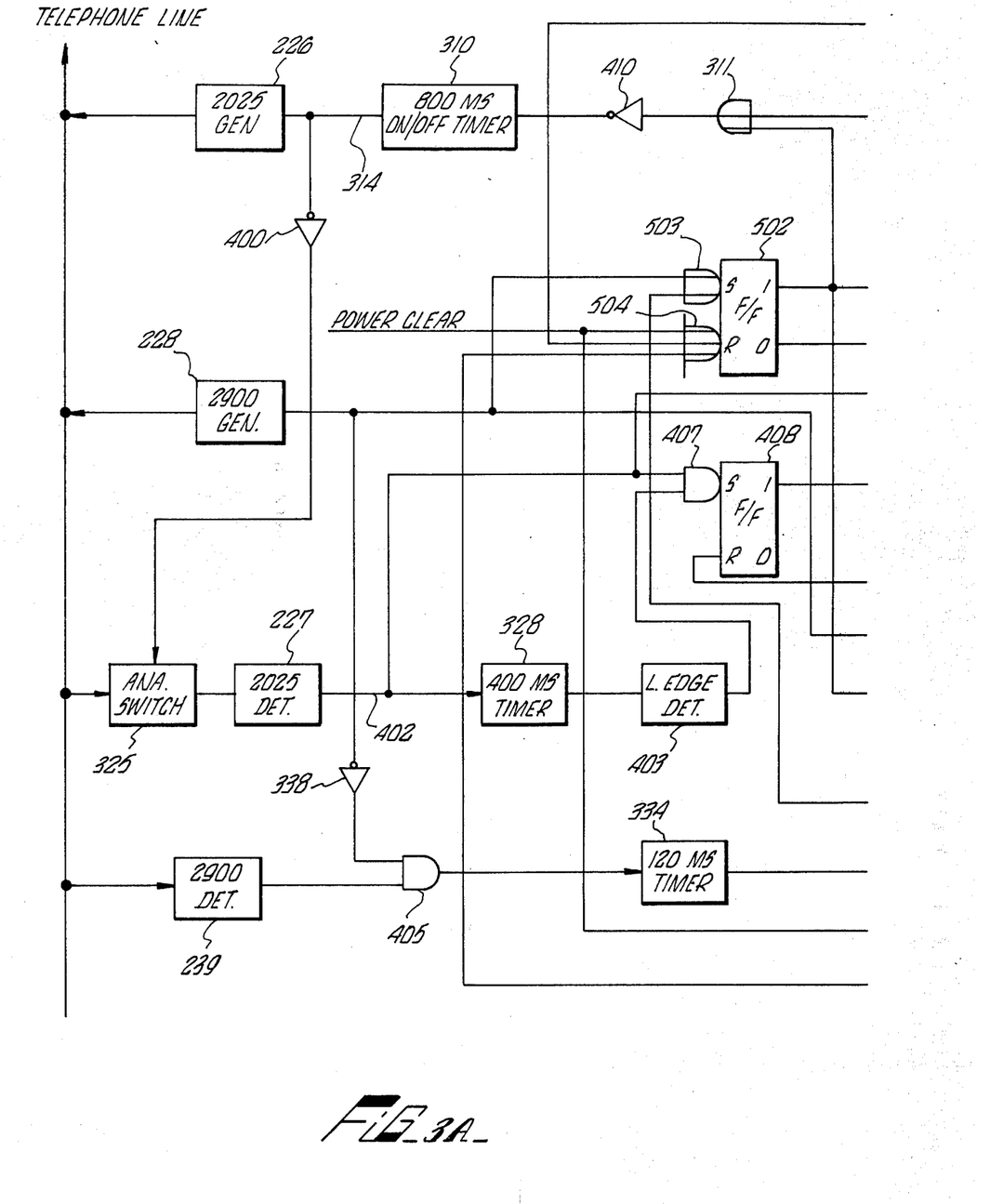
FIGS. 3A and 3B is a combined block and logic schematic of one of the line verify circuits of FIG. 2.
Figure 3B:
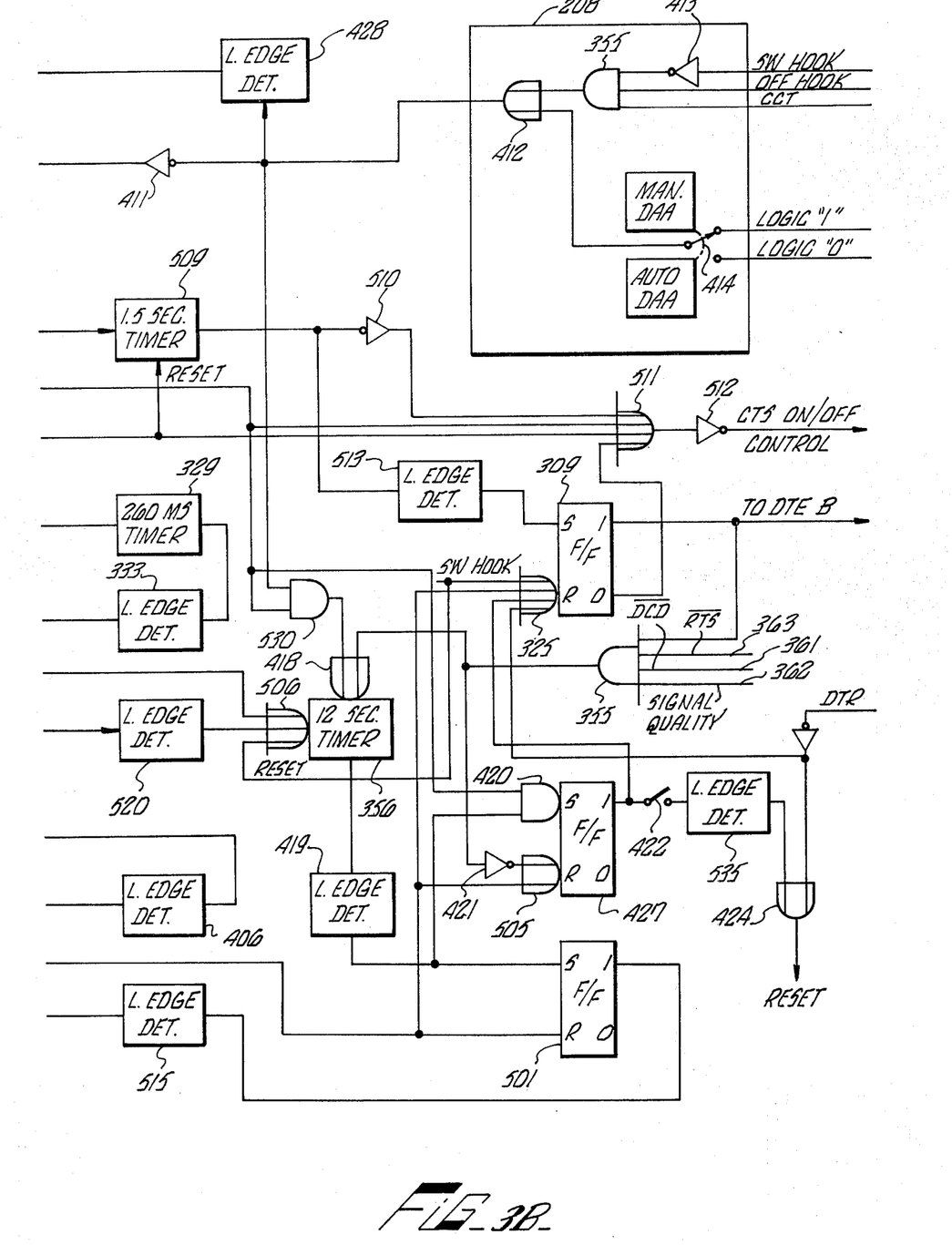

Although the aforementioned patent application describes both a four-wire/full-duplex and a two-wire/-half-duplex operation, this invention is only applicable to two-wire/half-duplex operation. In two-wire operation, the line verification sequence is always preceded by a power clear pulse delivered in a well-known manner by the modem to OR gates 504, 505 and 525 (FIG. 3). This power clear pulse causes control flip flops 502, 501, 427 and 309 to assume an initial or reset condition.

Connected to control flip flop 502 is an OR gate 311. The lower lead input to OR gate 311 is at (logic "0") whenever flip-flop 502 is in a reset condition. OR gate 311 thus awaits the state of the uppermost input from start circuit 208 in order to enable a timer 310 via inverter 410. The start command input to OR gate 311 from circuit 208, in turn, is determined by the status of the data coupler operation described earlier.

It is necessary to consider a difference in operation between manual and automatic couplers. The switch or strap option labelled 414 is connected to assume either a manual or automatic mode depending upon the applicable equipment being employed. If switch 414 is in the manual mode, the OR gate 412 generates a positive or true output signal (logic "1") which signal in turn is inverted to a negative (logic "0") or false, signal by inverter 411. Accordingly, both inputs to OR gate 311 are at logic "0" status when flip-flop 502 is in its reset status. That consequent logic 0 output from OR gates 311 is inverted by inverter 410 to start the operation of the 800 ms. on/off timer 310.

If an automatic coupler is being employed, then switch 414 is moved to the lower signal terminal marked logic "0". When strap 414 is in the auto DAA position, in order to get proper starting conditions, AND gate 355 must have all inputs at a logic "1". The three inputs to AND gate 355 are determined by the status of off-hook, switch-hook and CCT all as described in detail in the referenced publications. If all three signals present are a logic "1" condition, it means that the coupler has been cut through, that the off-hook flip-flop (not shown) is set and the coupler exclusion key is in the data mode (i.e., switch-hook is down). With all three of these conditions met, then both inputs to OR gate 311 are again at a logic "0" which causes the output of inverter 410 to go positive. Inverter 410 in this instance again causes the 800 ms. timer 310 to operate.

Thus, in either instance (based on the type of data coupler employed) timer 310 provides an 800 ms. ON signal followed by an 800 ms. OFF signal. The ON signal on line 314 is a logic "1". This signal directs the first tone generator 226 to provide an echo suppressor disabling tone to the telephone line.

When the first tone generator 226 is producing the 2025 Hz tone, inverter 400 delivers an inhibit command to an analog switch 325. Switch 325 is connected between the telephone network 100 and the 2025 Hz tone detector 227. When activated, switch 325 prevents any energy from the telephone line 100 from entering the 2025 detector 227. This operation thereby insures that the detector 227 is not triggered by the 2025 Hz tone produced from its own tone generator 226.

Timer 310, in the above-described manner, produces alternating 800 ms. periods of sending or 2025 Hz tone and listening for a 2025 Hz tone, by virtue of enabling analog switch 315. This alternating operation continues indefinitely until the line is established. Once the line is established, the modem signals from station A may be received at station B and vice versa.

The asynchronous nature of the 800 ms. timers at both modems may be fully appreciated by assuming first that modem 10 at the other end of the line has produced a 2025 tone at a time when analog switch 325 is enabled. That tone is detected by tone detector 227. Assume that detector 227 has just received, the first or leading edge of the 2025 tone. In response, it generates a signal on lead 402. The true signal on lead 402 causes a 400 ms. timer 328 to begin timing. The 400 ms. timer 328 will complete its timing if the 2025 Hz tone is received for at least 400 ms. When timer 328 times out, a leading edge detector circuit 403 produces a pulse to an AND gate 407. The AND gate 407 is enabled, provided that the 2025 Hz tone is still present on line 402 when the pulse from the leading edge detector 403 occurs. Assuming that there conditions are present, enabled AND gate 407 causes flip-flop 408 to be switched to a set, or "1", state. The tone on line 402 also resets 1.5 second timer 509.

When control flip-flop 408 is in a set state the following things occur:
1. By way of OR gate 503, it sets flip-flop 502 to a set state. The output signal from flip-flop 502 disables the 800 ms. timer 310 and starts 1.5 second timer 509;
2. A send command is issued to a 2900 Hz tone generator 228;
3. A 260 ms. timer 329 is enabled to start its time-out sequence; and
4. A 12 second timer 356 is reset.

When flip-flop 408 delivers send command to tone generator 228 to produce the 2900 Hz tone on the line, that signal is inverted by inverter 338. This inverted signal causes a disabled signal to be supplied to an AND gate 405 so that any signal which may be received by the 2900 Hz tone detector 229 is ignored.

Tone generator 228 places the 2900 Hz tone on the telephone line for about 260 ms. When timer 329 times out, it resets flip-flop 408 to a "0" state via edge detector 333. Flip-flop 408 consequently sends a command to the 2900 Hz generator 228 to cease sending.

Timer 509 is held inoperative until the 2025 Hz tone on line 402 completely goes away, at which time it starts timing out as a result of the output of flip-flop 502. At the end of 1.5 seconds, a set pulse is applied via edge detector 513 to DSR flip-flop 309, setting it to a "1" state. If for any reason before the 1.5 second period is up, the 2025 Hz detector 227 output goes high, timer 509 would be reset and the DSR flip-flop 309 output would stay in the "0" state.

The operation thus far has provided the following states for the control flip-flops:
1. Flip-flop 408 has been reset;

2. Flip-flop 502 is still set and its output is providing an inhibit function to the 800 ms. timer 310;

3. Flip-flop 309, the DSR flip-flop, has been set so as to deliver a DSR true command to DTE "B", as well as to the rest of the modem.

Recall that it was an original assumption that modem 10 at the other end of the line caused the 2025 Hz tone to be generated during the time that modem 20's 2025 detector (FIG. 3) was listening. Now reverse that assumption and presume that the 2025 detector 222 (FIG. 2) at the far end of the line has detected a 2025 Hz tone from generator 226 (FIG. 3). The line verification circuit 15 goes through the same cycle of operation as just described for line verification circuit 25 of modem 20. As a result, a second tone generator 223 (FIG. 2) causes its 2900 Hz tone to be sent to modem 25 for its 260 ms. time cycle. Since line verification circuitry 25 (FIG. 3) is not sending a 2900 Hz tone, AND gate 405 is enabled and the 2900 Hz tone from the other end is received by the 2900 Hz tone detector 239. Receipt of that tone activates a 120 ms. timer 334.

Timer 334 produces an output at the end of 120 ms. in order to accomplish two functions:

1. By way of leading edge detector 406, it sets internal DSR flip-flop 502. Again, this flip-flop 502 causes the 800 ms. timer 310 to be turned off and kept in an off condition.

2. It starts 1.5 second timer 509 timing out. At the end of the 1.5 second time delay, a set pulse is applied via edge detector 513 to DSR flip-flop 309, setting in to a "1" state. If, for some reason before the 1.5 second delay period is up, the 2025 Hz detector 228 goes high, resetting timer 509, DSR flip-flop 309 will remain in the "0" state. Accordingly, a DSR true signal is again delivered to DTE "B", and normal data may thereafter take place.

Refer to FIG. 1 for explanation of a further feature of this invention. If DTE "B", for example, is a type of terminal known in the prior art as an intelligent terminal, then once data modem 20 completes its data transmitting and receiving functions DTE "B" issues a DTR signal. DTR, standing for data terminal ready, is a signal from the digital terminal equipment. It is normally employed to signify that data transmission or reception is completed and the telephone line should be disconnected. DTR, as known, is true when data is being handled and drops false when data message transmission is concluded.

With reference to FIG. 3, as soon as the signal DTR drops false as a result of DTE "B", the output of inverter 423 goes high. That high condition is passed through OR gate 424, and is used to reset an off-hook flip-flop (not shown). Concurrently, the output of inverter 423 via OR gate 525 functions as an initiate singal to reset DSR flip-flop 309 to a "0" state.

In the case of an automatic DAA, the off-hook flip-flop (not shown) disconnects the telephone line. In a manual DAA environment, the operator must actually hang-up the telephone hand sets 126 and 176 on the cradle of telephones 125 and 175 (FIG. 1). In the case of an automatic DAA, there are certain instances where the DTE does not have internal hardware that drops the DTR signal when a call is finished. Our invention provides a solution for that problem in that an automatic disconnect circuit 236 (FIG. 4) is internally supplied by the modem itself.

Figure 4:
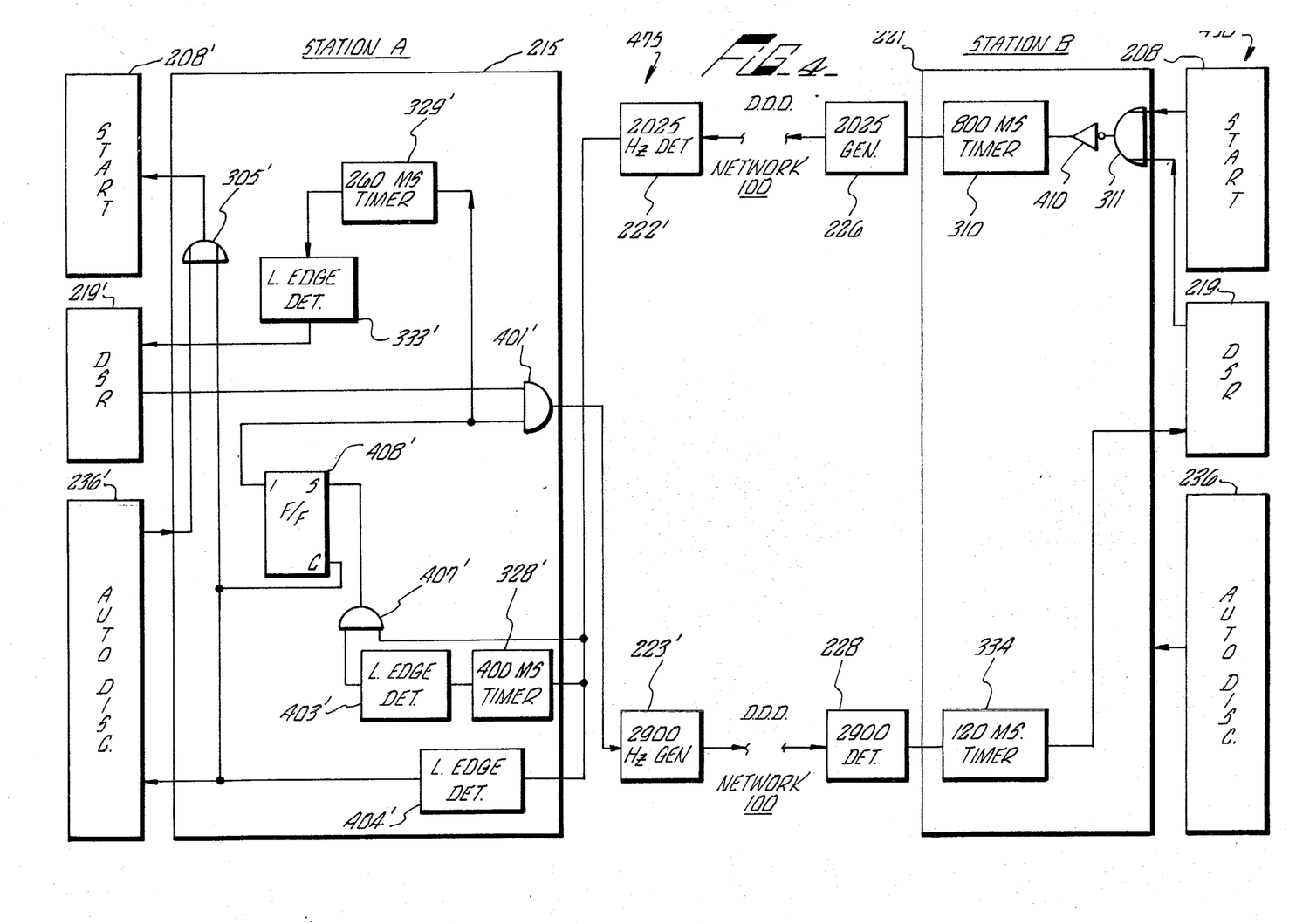
FIG. 4 is a combined block and logic diagram of line verify circuits of this invention operating in a master/slave modem situation.

Our automatic disconnect circuit 236 monitors certain signals and by virtue of this monitoring can determine whether either of the data terminal equipment is causing data to be transferred from one end or the other. This monitoring is done by using AND gate 355 which monitors four parameters; namely, RTS on line 363, DCD on line 361, and Integrated Signal Quality on line 362, along with a DSR signal from flip-flop 309. Any TIME THAT THE DSR signal is up or true, at least one of the other three inputs will be in a logic "0" condition, as long as data is being transmitted and/or received.

However, an absence of RTS from either terminal also results in an absence of DCD and Integrated Signal Quality from the modem, as is fully described in detail in the aforementioned co-filed application. AND gate 355 in such an instance has all four inputs in a true condition which results in a positive output through OR gate 418. Such a positive signal causes a 12 second timer 356 to start a time-out sequence. If at any time during the twelve second time-out, one or more of the inputs to AND gate 355 drops false, then timer 356 is immediately disabled in a known manner and no further timing function will continue. However, if timer 356 is allowed to time for a full 12 seconds, then upon timeout, it produces a pulse through leading edge detector 419. The output of edge detector 419 goes to two places, one to AND gate 420, another to the set input of flip-flop 501. At this point, if internal DSR flip-flop 502 is in the "1" state, AND gate 420 is disabled and no set pulse is applied to flip-flop 427. No disconnect signal has yet been generated. The set pulse to flip-flop 501, however, sets it to a "1" state. Flip-flop 501 via edge detector 515 resents internal DSR flip-flop 502 to a "0" state. The transition from a "1" state to "0" state of flip-flop 502 is detected by edge detector 520 and via OR gate 506 resets timer 356. Therefore, timer 356 is ready to start a new cycle. The significance of flip-flop 502 being in the "0" state is that the modem now starts a whole new cycle of line verification. It causes the 800 ms. timer 310 to be enabled, generating the 2025 Hz tone.

Now assume that in the remote end, no data transmission activity was detected for 12 seconds, and it also starts a new cycle of line verification routine. Making another assumption that the telephone line is still connected, the two modems will go through its line verification routine successfully. We shall explain below how this is accomplished. Suppose we assume it goes through the same operation of line verification as explained before. Internal DSR flip-flop 502, which is in the "0" state, now switches to the "1" state. The invert output of flip-flop 502 is now in the "0" state, thereby disabling AND gate 420. This prevents a set pulse from being applied to flip-flop 427 and generating an auto disconnect signal.

Let us take another case where the remote modem dropped the telephone line, leaving only the local modem hooked-up to the telephone line. Assuming no activity on the line, AND gate 355 will have all four inputs in a true condition which results in a positive output through OR gate 418. Such a positive signal causes the twelve second timer 356 to start a time-out sequence. At the end of twelve seconds, flip-flop 501 is set to a "1" state and via edge detector 515 and OR gate 504, resets internal DSR flip-flop 502 to an "0" state.

With flip-flop 502 in the "0" state, the 800 ms. timer 310 is enabled and the modem starts generating a 2025 Hz tone via generator 226. At the same time, edge detector 520 senses the transition of flip-flop 502 from a "1" state to an "0" state, and resets the 12 second timer 356 via OR gate 506. Timer 356 consequently starts a second time-out sequence. If at the end of the second 12 second interval, the DSR flip-flop 502 output is still in the "0" state, AND gate 420 stays enabled and a pulse from edge detector 419 sets flip-flop 427 to a "1" state. A set condition in flip-flop 427 via edge detector 535 results in a true condition being passed through OR gate 424. An output from OR gate 424 performs an automatic disconnect function. Also, this signal via OR gate 525 resets DSR flip-flop 309 to an "0" state. Resetting DSR flip-flop 309 makes the output of AND gate 355 low and in accordance with the operation just described, the time command for timer 356 goes low. An inverter 421 is responsive to that low condition to produce a reset command via OR gate 505 for flip-flop 427. Flip-flop 427 is thereby returned to its initial "0" state.

It should be pointed out that if the telephone line is hooked-up to both local and remote modems during the line verification routine that the DSR flip-flop 309 remains in the "1" state at all times. In data transmission, this is highly important. Data terminal equipment which interfaces with modems, usually interpret a "0" state of the DSR flip-flop as the end of data transmission. If DSR flip-flop output is allowed to switch between a "0" and "1" state during data transmission, the DTE will be confused and interface communication difficulty created. The only time that the DSR flip-flop 309 is allowed to drop to a "0" state is when the telephone line is disconnected at the other end, or the DTE desires to end transmission. A DTE goes through idle modes wherein no data transmission takes place and this invention provides the option of resuming data transmission without having the modem's DSR drop false.

During the line verification routine OR gate 511 and inverter 512 makes sure that no data transmission takes place by holding the clear to send (CTS) control of the modem in the offstate.

In the case of an automatic DAA, it is desirable that the length of time between when the coupler establishes a telephone connector to the modem and the period of time in which DSR goes true should be as limited as possible because occasionally the DAA may receive an improperly dialed call. If such an event occurs, the telephone may end up being held by virtue of some improper call reaching the modem's number. The line verify operation, of course, would never be completed because of the absence of line verify circuitry from the calling station. It is imperative that the wrong-dialed modem automatically release the connected line. The flip-flop 502 provides the ability to automatically terminate a wrong-number call. This feature of our invention is provided by leading edge detector 428 emitting a pulse when the start circuit 208 responds to the coupler in the manner described above.

An output pulse from detector 428 resets internal DSR flip-flop 502 to a "0" state, as a redundant measure. The inverted output of flip-flop 502 enables AND gate 530, so that the output from start circuit 208 starts timer 356 for a 12 second time-out sequence. Since it is assumed to be a wrong number call, and it is impossible to establish a line verify operation the output of DSR flip-flop 502 remains at the "0" state for the whole 12 seconds. Therefore, AND gate 420 is also enabled. At the end of 12 seconds, a set pulse is applied via AND gate 420 to flip-flop 427, setting it to a "1" state. This output goes through edge detector 535 and OR gate 424 to perform the automatic disconnect function described above.

While the advantages of having the line verification circuitry of this invention identical for easy interchangeability with all modems has already been stressed, it should be understood that there are instances wherein a master/slave modem configuration is not objectionable. The principles of this invention are equally applicable for such a master/slave configuration. In fact, the master/slave configuration saves a considerable amount of circuitry and results in simplicity of operation. It is objectionable, however, from the standpoint of increased inconvenience in replacement situations.

In FIG. 4, a "master" line verification circuit 450 is depicted at station B and a "slave" line verification ciricuit 475 is shown at station A. Station A and B are again connected together through a two-wire/half-duplex DDD network 100. Because of the identify of functions of the circuits employed in FIG. 4 as compared with FIG. 3, the same numbers have been used in FIG. 4 to designate the same components in FIG. 3. At slave station A, a prime is added to the numbers of FIG. 3.

At the master location of station B, start circuitry 208 starts the operation when DSR is down and the DAA conditions are proper as earlier described in conjunction with FIG. 3. Control and logic circuitry 221 in response to the start command enables a first tone generator 226, which tone generator emits a 2025 Hz tone continuously when DSR is in a "0" state. The tone from generator 226 is applied to DDD network 100.

Also, at the master site is a 2900 detector 228 which continuously listens for a 2900 Hz tone. Accordingly, the master line verification circuitry 450 continuously sends 2025 Hz and continuously listens for a 2900 Hz tone. Connected to the output of the 2900 Hz detector 229 is a 120 ms. timer 334. When a 2900 Hz tone is detected for at least 120 ms., the output of timer 334 sets the data set ready F/F to a "1" state in DSR circuit 219 as earlier described. A DSR signal is delivered to DTE "B"; and via OR gate 311 and inverter 410, timer 310 is disabled until the line verification cycle repeats itself.

At slave station A, line verification circuitry 475 includes a 2025 Hz detector 222' which is continuously listening for a 2025 Hz tone and a 2900 Hz true generator 223'. Upon receipt of a tone at detector 222', leading edge detector 404' clears control F/F 408' and signals auto-disconnect circuit 236'. In addition, an output from the 2025 Hz detector 222' enables a 400 ms. timer 328'. The timer 328' times out if the 2025 Hz tone is detected by detector 222' for at least 400 ms. When timer 465' times out, a leading edge detector 403' pulses AND gate 407'. Provided that detector 222' is still detecting a 2025 Hz tone, as earlier described AND gate 407' is satisfied and causes control F/F 408' to be set to a "1" state. DSR circuit 219' includes a flip-flop whose "0" state delivers a true, or enabling signal to AND gate 401'. That enabling signal coincident with a "1" state in flip-flop 408' enables AND gate 401' in order to apply a send command to the 2900 Hz tone generator 223'.

Also connected to the output of the "1" terminal of flip-flop 408' is 260 ms. timer 329' which starts timing when flip-flop 408' is set to a "1" state. Flip-flop 208 then sets flip-flop 502 to a "1" state. If internal DSR flip-flop 502 stays in the "1" state for 1.5 seconds, a set pulse is applied by way of edge detector 513 to DSR flip-flop 309. DSR flip-flop 309 is set to a "1" state and a DSR signal is delivered to DTE "B". Setting the DSR flip-flop removes the enabling condition for AND gate 401' and tone generator 223' is disabled. Thus, in the master/slave situation an automatic line verification operation is readily and simply provided in accordance with the principles of this invention.

It is to be understood that the foregoing features and principles of this invention are merely descriptive, and that many departures and variations thereof are possible by those skilled in the art, without departing from the spirit and scope of this invention.

What is claimed is:

1. Line verification circuitry for first and second data sets adapted for connection together through a telephone line which includes echo suppressors that are capable of being disabled by a first unique signal so that data provided by data terminal equipment can be transmitted between said first and second data sets after said data sets assume a data set ready condition, said verification circuitry comprising:

means at said first data set for emitting said first unique signal;

means at said second data set, responsive to receipt of said first signal for emitting a second unique signal;

means at said second data set including a first delay means for delivering a data set ready signal a predetermined period of time after emission of said second unique signal; and means at said first data set, responsive to receipt of said second unique signal from said second data set for delivering a data set ready signal.

2. The line verification circuitry according to claim 1, wherein said means at said first data set for delivering a data set ready signal further comprises means including a second delay means for delaying delivery of said data set ready signal a predetermined period of time after receipt of said second unique signal.

3. The line verification circuitry of claim 2, wherein said predetermined period of time of delay provided by said second delaying means at said first data set is approximately 1½ seconds.

4. The line verification circuitry of claim 1, wherein said predetermined period of time of delay provided by the first delay means is approximately 1½ seconds.

5. The line verification circuitry of claim 4, wherein said predetermined period of time of delay provided by said delaying means at said first data set is approximately 1½ seconds.

6. The line verification circuitry of claim 1, further comprising:

means for maintaining said data set ready signal at said second data set during periods of no data being sent or received in a message transmission, said means removing said data set ready signal only in response to an end of message signal, or a predetermined time interval wherein no data is being sent or received.

7. The line verification circuitry of claim 6 wherein said perdetermined time interval of said maintaining means is approximately 24 seconds.

8. The verification circuitry of claim 1, further comprising:

means at said second data set for emitting said first unique signal;

means at said first data set, responsive to receipt of said first signal for emitting a second unique signal;

means at said first data set for delivering a data set ready signal a predetermined period of time after emission of said second unique signal; and means at said second data set responsive to receipt of said second unique signal from said first data set for delivering a data set ready signal.

9. The verification circuitry of claim 8, further comprising:

means at said first data set for directing the alternate emitting and listening for said first unique signal; and means at said second data set for directing the alternate emitting and listening for said first unique signal.

10. The line verification circuitry according to claim 8, wherein said means at said first data set, responsive to receipt of said second unique signal, and said means at said second data set responsive to receipt of said second unique signal further comprises means for delaying delivery of respective said data set ready signal a predetermined period of time after receipt of said second unique signal.

11. Line verification circuitry for a data set adapted for connection to another like data set through a telephone line which includes echo suppressors that are capable of being disabled by a first unique signal so that data provided by data terminal equipment can be transmitted between a pair of said data sets after said data sets assume a data set ready condition, said verification circuitry comprising:

means for emitting said first unique signal;

means for receiving said first unique signal, said means for receiving being active only when said means for emitting is inactive;

means, responsive to receipt of said first unique signal for emitting a second unique signal;

means for receiving said second unique signal, said means for receiving being active only when said means for emitting is inactive; and means including a delay means for delivering a data set ready signal a predetermined period of time after either emitting said second unique signal or receiving said second unique signal.

12. The line verification circuitry of claim 11, wherein said predetermined period of time provided by said delivering means is approximately one and one-half second.

13. The line verification circuitry of claim 11, further comprising:

means for maintaining said data set ready signal during periods of no data being sent or received in a message transmission, said means removing said data set ready signal only in response to an end of message signal, or a predetermined time interval wherein no data is being sent or received.

14. The line verification circuitry of claim 13, wherein said predetermined time interval of said maintaining means is approximately 24 seconds.

* * * * *